(12) United States Patent
Hatae et al.

(10) Patent No.: US 7,417,792 B2
(45) Date of Patent: Aug. 26, 2008

(54) OPTICAL AMPLIFICATION DEVICE

(75) Inventors: Kazuhiko Hatae, Kawasaki (JP);
Nobukazu Koizumi, Kawasaki (JP);
Masato Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/079,080

(22) Filed: Mar. 15, 2005

(65) Prior Publication Data
US 2005/0157380 A1    Jul. 21, 2005

Related U.S. Application Data

(63) Continuation of application No. PCT/JP03/00919, filed on Jan. 30, 2003.

(51) Int. Cl.
*H04B 10/17*    (2006.01)

(52) U.S. Cl. .............................. 359/341.43; 359/341.41; 398/37

(58) Field of Classification Search ............ 359/341.41, 359/341.43
See application file for complete search history.

(56) References Cited

U.S. PATENT DOCUMENTS

| | | | |
|---|---|---|---|
| 5,340,979 A | 8/1994 | Baney et al. | |
| 6,038,063 A | 3/2000 | Tsuda et al. | |
| 6,356,386 B1 | 3/2002 | Denkin et al. | |
| 6,417,964 B1* | 7/2002 | Zhang et al. | 359/341.41 |
| 6,490,079 B2 | 12/2002 | Choi et al. | 359/341.4 |
| 6,542,291 B1* | 4/2003 | Kinoshita et al. | 359/341.33 |
| 6,762,878 B2 | 7/2004 | Park et al. | 359/341.42 |
| 6,781,741 B2 | 8/2004 | Uesaka | |
| 7,158,290 B2* | 1/2007 | Oota et al. | 359/341.4 |
| 2001/0040721 A1* | 11/2001 | Gerrish et al. | 359/341.41 |
| 2002/0015221 A1 | 2/2002 | Krummrich et al. | |
| 2002/0027706 A1 | 3/2002 | Park et al. | |
| 2002/0090039 A1* | 7/2002 | Koizumi et al. | 375/316 |
| 2004/0027651 A1* | 2/2004 | Balland et al. | 359/341.41 |
| 2005/0116147 A1* | 6/2005 | Oota et al. | 250/214 AG |

(Continued)

FOREIGN PATENT DOCUMENTS

EP    0910139    4/1999

(Continued)

OTHER PUBLICATIONS

Japanese Patent Office Action mailed Jun. 27, 2006 for corresponding Japanese Patent Application No. 2004-567538.

*Primary Examiner*—Jack W Keith
*Assistant Examiner*—Ari M Diacou
(74) *Attorney, Agent, or Firm*—Staas & Halsey LLP

(57) ABSTRACT

An optical amplification device is disclosed that performs feedback control to maintain an amplification gain to be a constant based on measured power of input light and power of output light. The device includes a feedback control coefficient switching unit configured to, when performing the feedback control on a difference from an object amplification gain, distinguish a state of increasing or decreasing the number of frequencies of the input light and a steady state by making comparison and determination whether an amplitude of at least one of the power of the input light and the power of the output light is in a predetermined range, and switch the feedback control coefficient. Therefore, it is possible to reduce variation of the power of the output light caused by noise in the steady state without affecting operations of increasing and decreasing a number of frequencies of a light signal.

9 Claims, 15 Drawing Sheets

U.S. PATENT DOCUMENTS

| | | |
|---|---|---|
| 2006/0147219 A1 | 7/2006 | Yoshino et al. |
| 2006/0159384 A1 | 7/2006 | Sugiyama |
| 2007/0070492 A1* | 3/2007 | Oota et al. ............. 359/341.41 |

FOREIGN PATENT DOCUMENTS

| | | |
|---|---|---|
| EP | 1130822 | 9/2001 |
| EP | 1187275 | 3/2002 |
| JP | 7-221737 | 8/1995 |
| JP | 9-200145 | 7/1997 |
| JP | 11-112434 | 4/1999 |
| JP | 2000-40847 | 2/2000 |
| JP | 2000-349718 | 12/2000 |
| JP | 2001-267668 | 9/2001 |
| JP | 2002-118316 | 4/2002 |
| JP | 2003-255283 | 9/2003 |
| JP | WO 2005/008923 | 1/2005 |
| JP | 2006-195256 | 7/2006 |
| WO | WO 00/13313 | 3/2000 |
| WO | WO 01/80380 | 10/2001 |

* cited by examiner

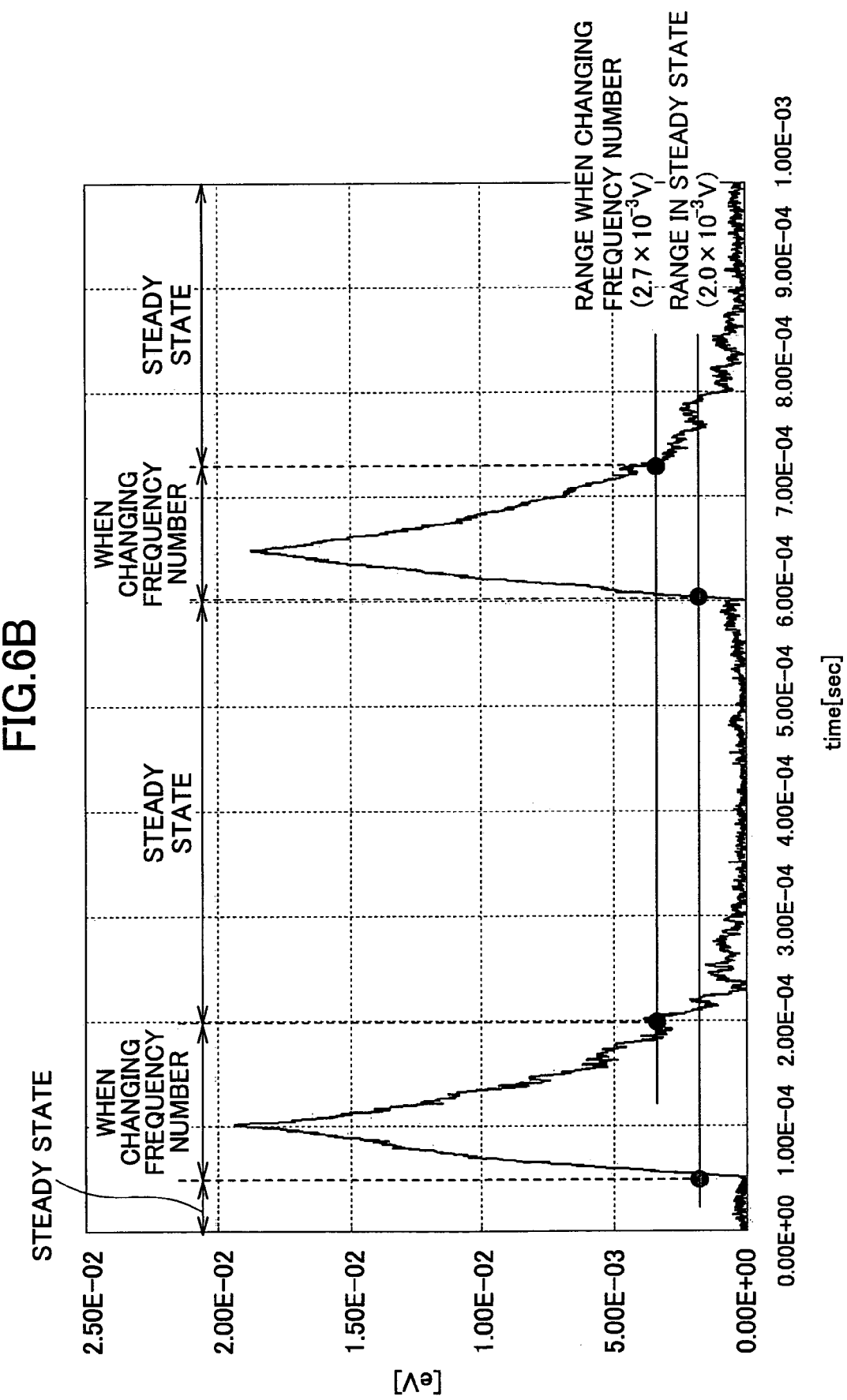

ATTENUATION COEFFICIENT 1/d

OPTICAL AMPLIFICATION DEVICE

CROSS-REFERENCE TO RELATED APPLICATION

This application is a U.S. continuation application filed under 35 USC 111(a) claiming benefit under 35 USC 120 and 365(c) of PCT application JP03/000919, filed Jan. 30, 2003. The application is hereby incorporated herein by reference.

TECHNICAL FIELD

The present invention generally relates to an optical amplification device, and particularly, to an optical amplification device used in a wavelength division multiplex system.

TECHNICAL BACKGROUND

In an optical communication system, optical amplifiers are provided at each preset distance in the optical transmission path to realize long-distance optical transmission. For example, in the optical transmission path across the Pacific Ocean, several tens to several hundreds of optical amplifiers are provided. For example, one of the optical amplifiers is an optical fiber doped with rare-earth ions.

In the meantime, along with increasingly wide use of the Internet, capacity of data transmitted via networks drastically increases, and it is required that the transmission capacity of optical communication systems be increased further. One of the techniques for increasing the transmission capacity of an optical transmission system is wavelength division multiplexing (WDM), and a WDM transmission system has been put into practical use.

In the WDM transmission system, plural signals having different wavelengths are multiplexed, and transmitted through one optical fiber. Hence, in the WDM transmission system, it is required that the optical amplifier be able to amplify the plural signals at one time. Meanwhile, the so-called ADM (Add Drop Multiplexer) device, which increases and decreases the number of frequencies of individual light signals, and in which power of the light signals transmitted by the optical fiber is not constant, has been put into practical use. Even when the number of frequencies of signals varies, it is expected that power of the output light at a specified frequency can be controlled to be constant by controlling the gain of optical amplifiers. This control is referred to as AGC (Automatic Gain Control).

However, in the WDM transmission system, when the distance between optical amplifiers is long, signal attenuation in the transmission path increases; thus amplifiers of high gains are required, but this causes various noises.

The reasons for the noises in optical amplifiers probably include external noise, noise from optical elements, and ASE (Amplified Spontaneous Emission) noise due to natural light emission.

FIG. 1 shows signal spectra from an optical amplifier using an erbium doped fiber (EDF).

As illustrated in FIG. 1, comparing the spectra before and after amplification, it is found that there is a spectrum in a broad band added to the amplified signal after amplification. This additional broad band spectrum is called ASE noise, which is generated when a portion of natural light emission is coupled with the basic mode of an optical fiber, and is amplified due to induced emission.

When the number of frequencies of a light signal is small, the portion of these noises relative to the total power of the signal is not negligible any longer when executing AGC.

For example, Japanese Laid Open Patent Application No. 9-200145 and Japanese Laid Open Patent Application No. 7-221737 (below, referred to as "reference 1" and "reference 2") disclose techniques of controlling an amplification gain to be constant in optical amplifiers capable of fast response. In reference 1, a fiber is inserted between an input light monitor and an optical amplifier to delay a light signal. In reference 2, adjustment light, which is used for making adjustment, is input to cancel out variation of an input light, thereby, obtaining a constant gain.

The technique disclosed in reference 1 provides a margin in control time, thus enabling fast response, but the excessive optical fiber causes degradation of performance, and the optical amplifier becomes large.

The technique disclosed in reference 2 is able to narrow the range of the power of the input light to be adjusted, and thus facilitates realization of fast response, but it becomes necessary to control the adjustment light at a high speed, and power consumption and temperature increase due to additional output of the adjustment light.

In AGC of the related art, both the noise component and the signal component are amplified if the influence of noise on the input light is large, and this causes variation of the power of the output light.

During operations of increasing or decreasing the number of frequencies of light signals, the variation of power of output light caused by noise is not a severe problem, because this variation of the power is small compared to the variation of the power of the output light caused by the operations of increasing or decreasing the number of frequencies. However, in a steady state, that is, without the operations of increasing or decreasing the number of frequencies, the variation of the power of the output light caused by noise is dominant, and it constitutes the variation of the power of the output light. Therefore, it is required to reduce amplification of the noise.

To reduce amplification of the noise in input signals, it is sufficient to just reduce a feedback control coefficient. However, if the feedback control coefficient is maintained to be small constantly, tracking due to AGC is delayed during operations of increasing or decreasing the number of frequencies of light signals, and the variation of the power of the output light increases. To solve this problem, if it is set to switch the feedback control coefficient during operations of increasing or decreasing the number of light signal frequencies and in the steady state, it is necessary to devise a method of determining the switching, and to reduce the variation of the power of the output light caused by changing of the coefficients during the switching. In the related art, these factors are not taken into consideration.

In addition, concerning the ASE noise, the influence thereof increases when the number of light signal frequencies is small. If assuming the power of the input light to an optical amplifier is In, the power of the output light from the optical amplifier is Out, and an object gain is G, the gain error (GE) of AGC control can be calculated by using the following formula.

$$GE = \text{In} \times G - \text{Out},$$

Here, considering an ASE noise ASEnoise is input to the optical amplifier, then $$GE = (\text{In} + ASEnoise) \times G - \text{Out}$$

-continued $$= (1 + ASEnoise/\text{In}) \times \text{In} \times G\text{-Out.}$$

If the power of the input light In decreases due to decrease of the number of light signal frequencies, the gain error (GE) of the AGC control increases, and this causes output ripples (variation of the power). For this reason, it is necessary to monitor the power of the input light and make compensations. However, compensations for the AGC control are not performed in the related art.

DISCLOSURE OF THE INVENTION

A general object of the present invention is to provide an optical amplification device able to reduce variation of power of output light caused by noise in a steady state without affecting operations of increasing and decreasing a number of frequencies of an input light signal, and able to reduce variation of power of the output light caused by ASE noise when decreasing the number of frequencies of the input light signal.

According to an aspect of the present invention, there is provided an optical amplification device that performs feedback control to maintain an amplification gain to be a constant based on measured power of input light and power of output light, said optical amplification device comprising: a feedback control coefficient switching unit configured to, when performing the feedback control on a deviation from an object amplification gain, distinguish a state of increasing or decreasing the number of frequencies of the input light and a steady state by making comparison and determination whether an amplitude of at least one of the power of the input light and the power of the output light is in a predetermined range, and switch the feedback control coefficient.

According to the above optical amplification device, it is possible to reduce variation of the power of the output light caused by noise in the steady state without affecting operations of increasing and decreasing the number of frequencies of the input light signal.

BRIEF DESCRIPTION OF THE DRAWINGS

FIG. 6B is a waveform of the absolute value of the difference between the average power of the output light and the present samples of the power of the output light;

BEST MODE FOR CARRYING OUT THE INVENTION

Below, embodiments of the present invention are explained with reference to the accompanying drawings.

Figure 1:
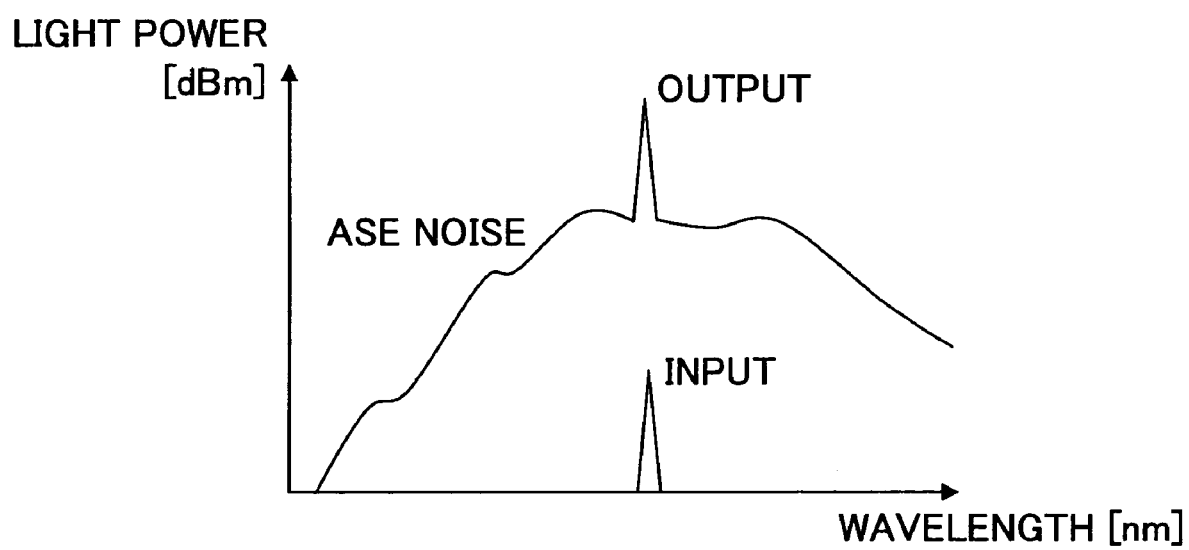
FIG. 1 shows signal spectra of an optical amplifier before and after amplification.
Figure 2:
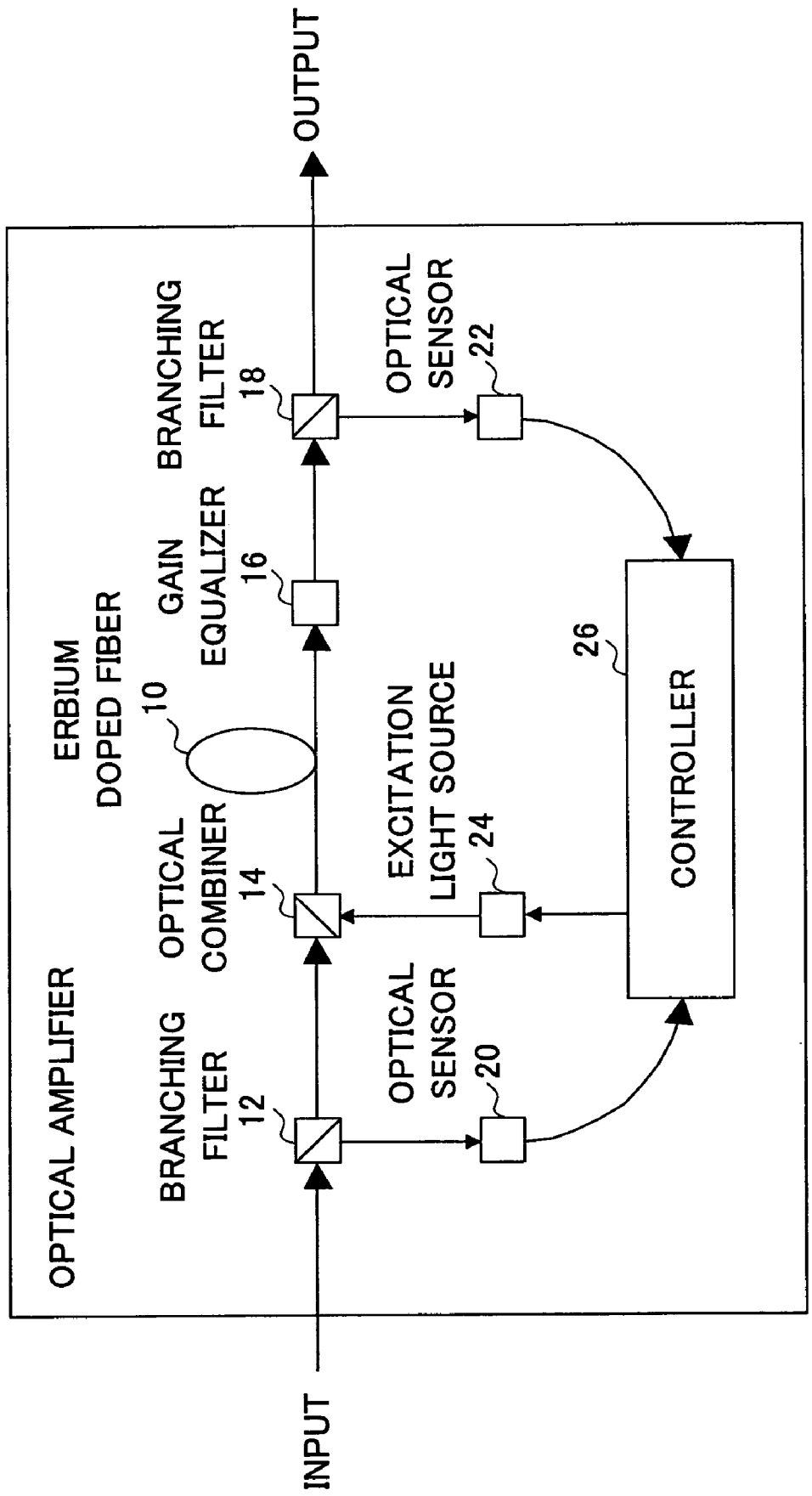
FIG. 2 is a block diagram illustrating an optical amplifier according to an embodiment of the present invention.

FIG. 2 is a block diagram illustrating an optical amplifier according to an embodiment of the present invention. This optical amplifier is an erbium doped fiber optical amplifier which uses an erbium doped fiber (EDF).

In FIG. 2, wavelength-multiplexed light input through an input port is directed to an erbium doped fiber 10, and is output to an output port after being amplified in the fiber 10. A branching filter 12 for use of control and an optical combiner 14 are provided on the input port side of the erbium doped fiber 10. A gain equalizer 16 for equalizing gains related to different wavelengths and a branching filter 18 for use in control are provided on the output port side of the erbium doped fiber 10. Optical sensors 20, 22 for detecting the power of input light and output light are connected to the branching filter 12 and the branching filter 18, respectively.

Excitation light output from an excitation light source 24 is supplied to the optical combiner 14. A controller 26 controls the strength of the output light from the excitation light source 24 according to the power of the light detected by the optical sensors 20, 22. Below, descriptions are made with this configuration as an example, but the present invention is not limited to this configuration.

Figure 3:
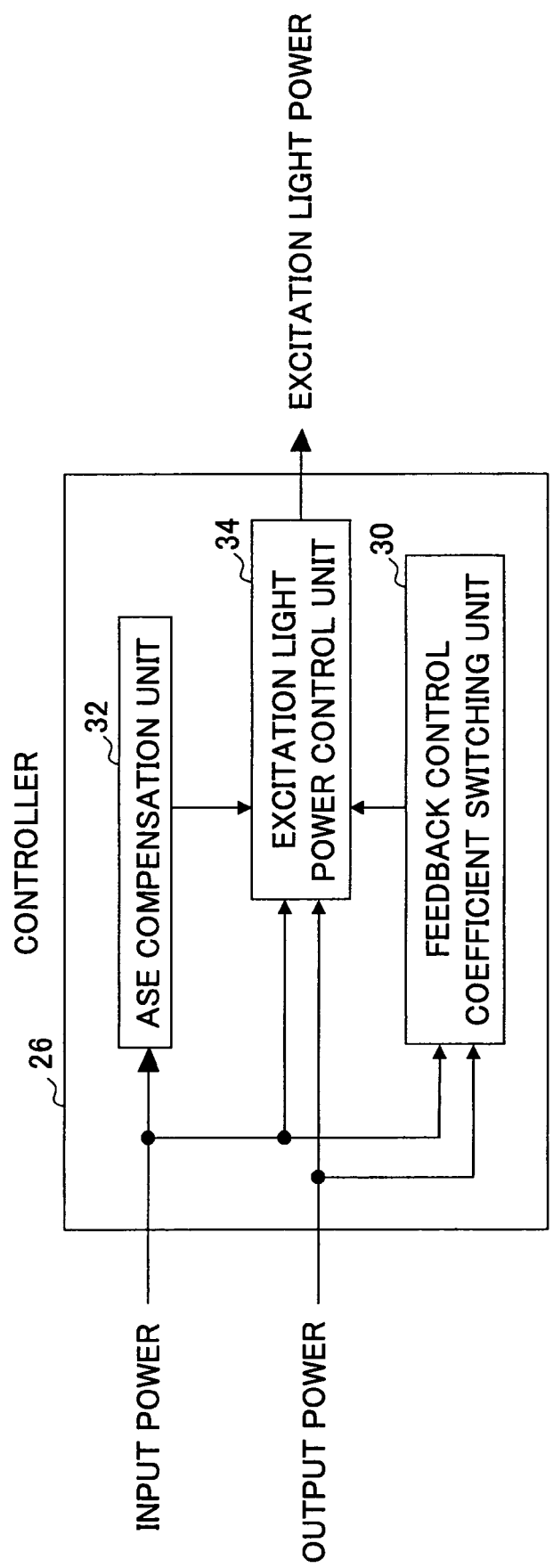
FIG. 3 is a block diagram illustrating an example of the controller.

FIG. 3 is a block diagram illustrating an example of the controller 26.

In FIG. 3, the controller 26 includes a feedback control coefficient switching unit 30 that performs feedback control coefficient switching control from the power of the input and the output light supplied from the branching filter 12 and the branching filter 18, an ASE compensation unit 32 that performs ASE compensation control from the power of the input light, and an excitation light power control unit 34 that performs excitation light power control including feedback control in response to the power of the input and the output light, and outputs of the feedback control coefficient switching unit 30 and the ASE compensation unit 32.

Figure 4:
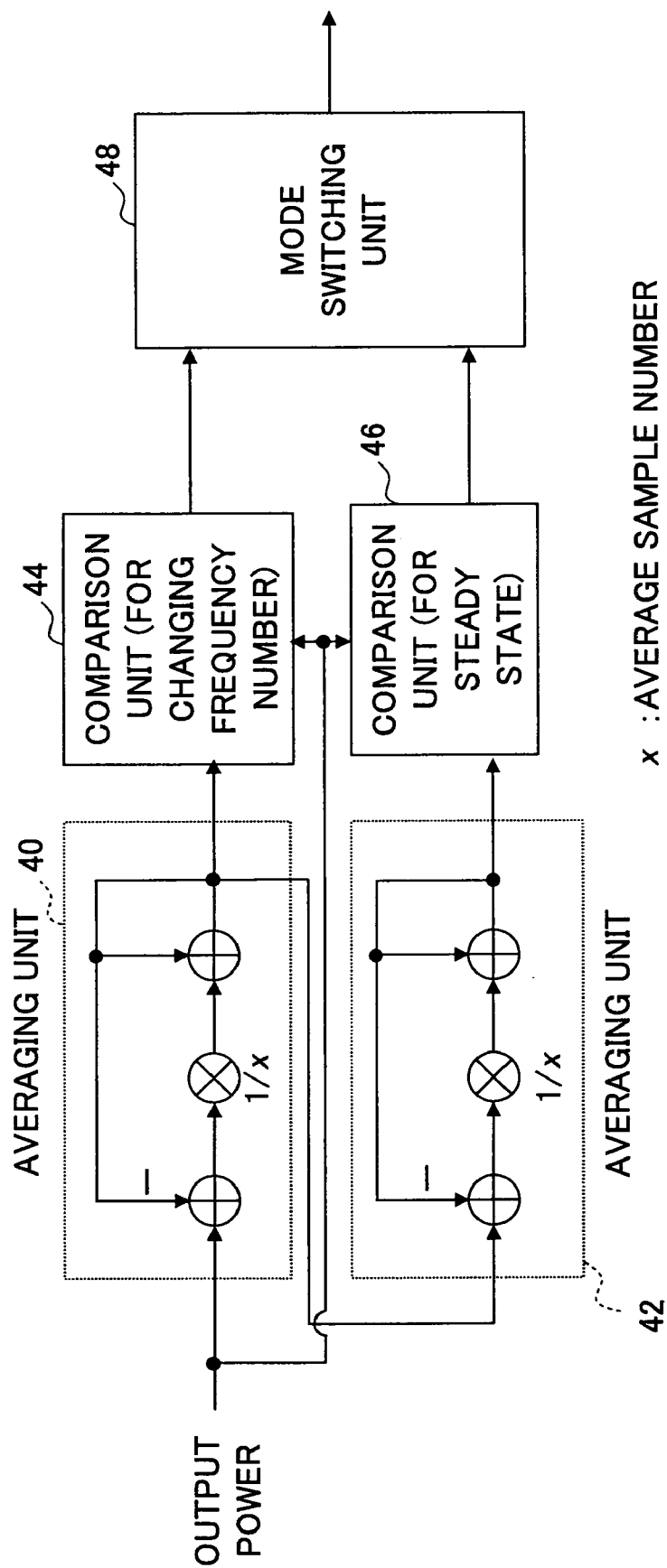
FIG. 4 is a block diagram illustrating an example of a feedback control coefficient switching unit.

FIG. 4 is a block diagram illustrating an example of the feedback control coefficient switching unit 30.

Figure 5:
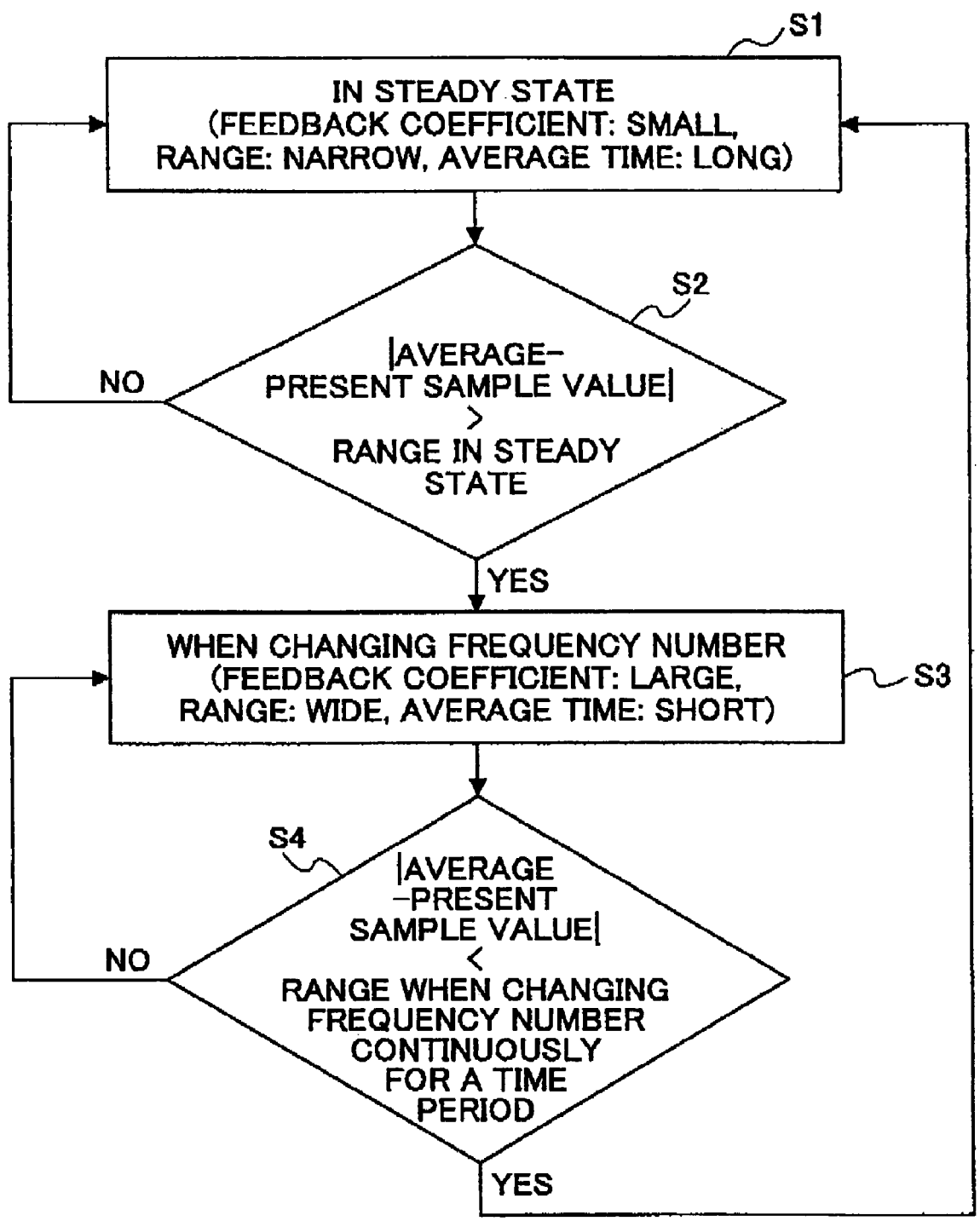
FIG. 5 is a flowchart illustrating a feedback control coefficient switching operation.

FIG. 5 is a flow chart illustrating the feedback control coefficient switching operation.

In FIG. 4, the power of the output light from the branching filter 18 is supplied to an averaging unit 40. The averaging unit 40, for example, calculates an average value of 256 samples in every 200 nsec, and this average value is supplied to an averaging unit 42 and a comparison unit 44 as the average value used when increasing or decreasing the number of frequencies.

The averaging unit 42, for example, calculates an average value of 256 samples in every 40 μ sec, and this average value is supplied to an averaging unit 42 and a comparison unit 44 as the average value in a steady state.

The comparison unit 44 sets a range, for example, ±2.7×10$^{-3}$ V, at the time of increasing or decreasing the number of frequencies, with the average value at the time of increasing or decreasing the number of frequencies as a central value. When the power of the output light is within the range ±2.7×10$^{-3}$ V (that is, the absolute value is lower than 2.7×10$^{-1}$ V for a certain time period, the comparison unit 44 generates a trigger for switching to the steady state mode, and supplies the same to a mode switching unit 48.

The comparison unit 46 sets a range in the steady state, for example, ±2.0×10$^{-3}$ V, with the average value in the steady state as a central value. When the power of the output light is out of the range ±2.0×10$^{-3}$ V for a certain time period, the comparison unit 46 generates a trigger for switching to the increase and decrease mode, and supplies the same to the mode switching unit 48.

When the increase and decrease mode switching trigger is supplied (that is, when the answer is yes in step S2 in FIG. 5), the mode switching unit 48 outputs a preset increase and decrease mode feedback control coefficient α (step S3 in FIG. 5). When the steady state mode switching trigger is supplied (that is, when the answer is Yes in step S4 in FIG. 5), the mode switching unit 48 outputs a preset steady state mode feedback control coefficient β (step S1 in FIG. 5). The feedback control coefficients α, β include differential coefficients, integration coefficients, and slope coefficients, and the increase and decrease mode feedback control coefficient α is greater than the steady state mode feedback control coefficient β.

Figure 6A:
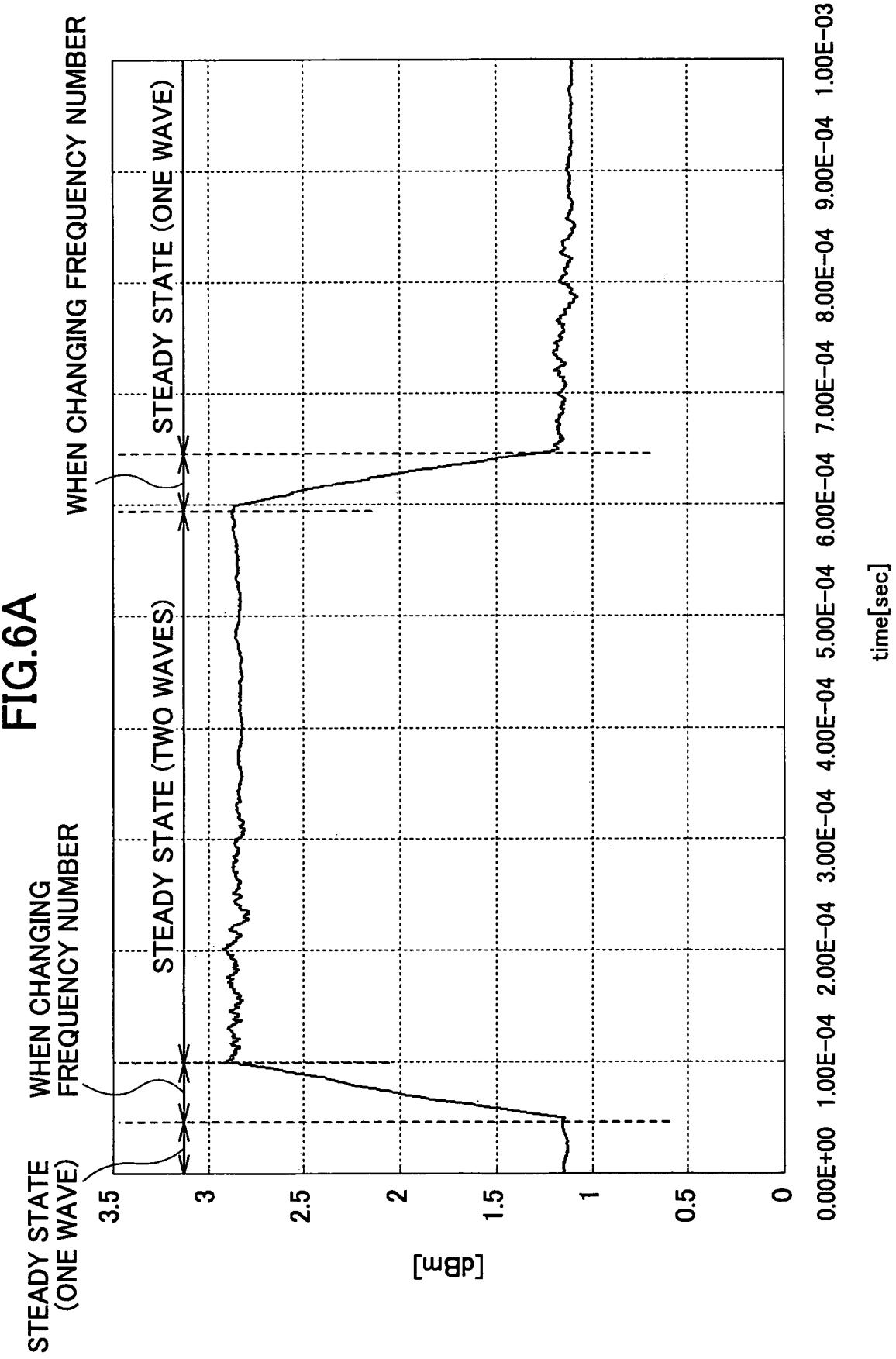
FIG. 6A is a waveform of the power of output light when the number of frequencies changes.

FIG. 6A is a waveform of the power of the output light from the optical sensor 22 when the number of frequencies changes to be one, two, and one.

FIG. 6B is a waveform of the absolute value of the difference between the average power of the output light in the above case and the present samples of the power of the output light.

Figure 7:
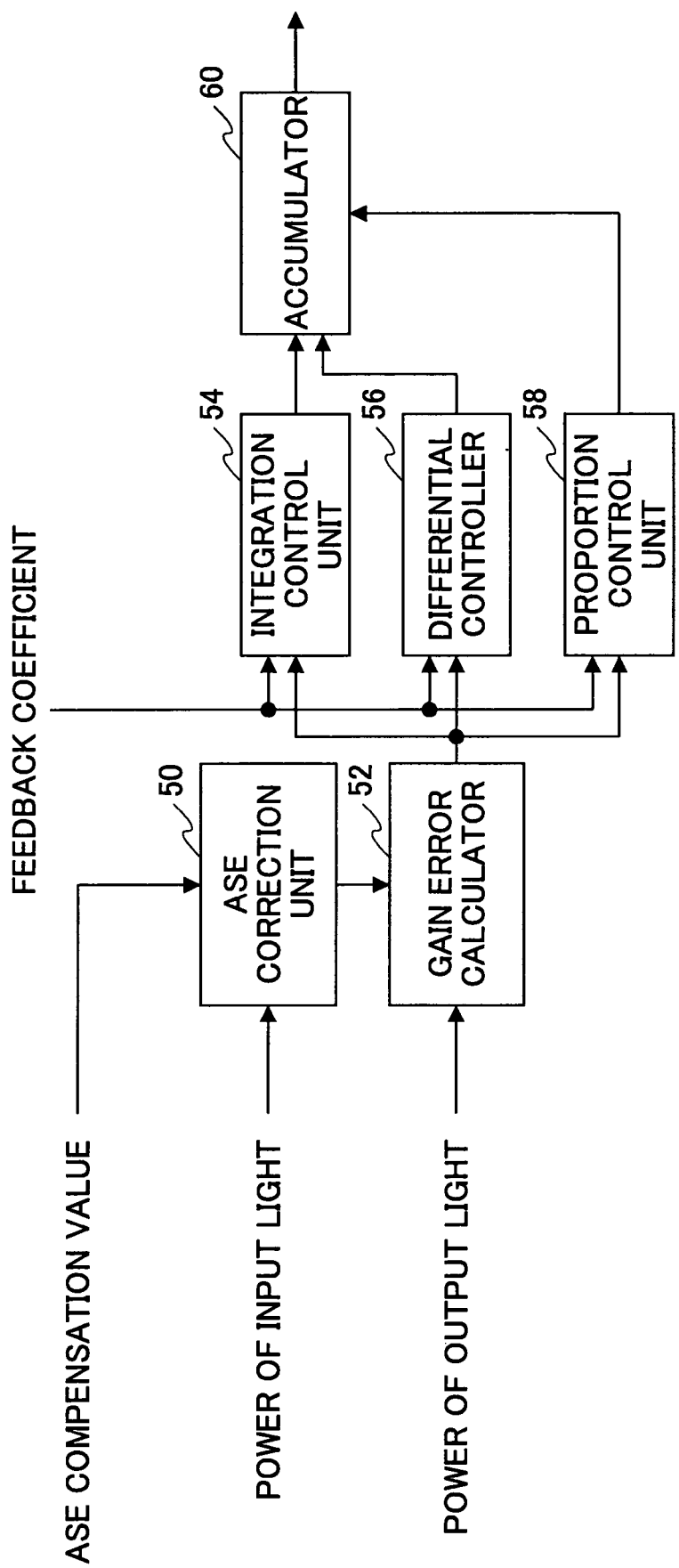
FIG. 7 is a block diagram illustrating an example of an excitation light power control unit.

FIG. 7 is a block diagram illustrating an example of the excitation light power control unit 34.

Figure 8:
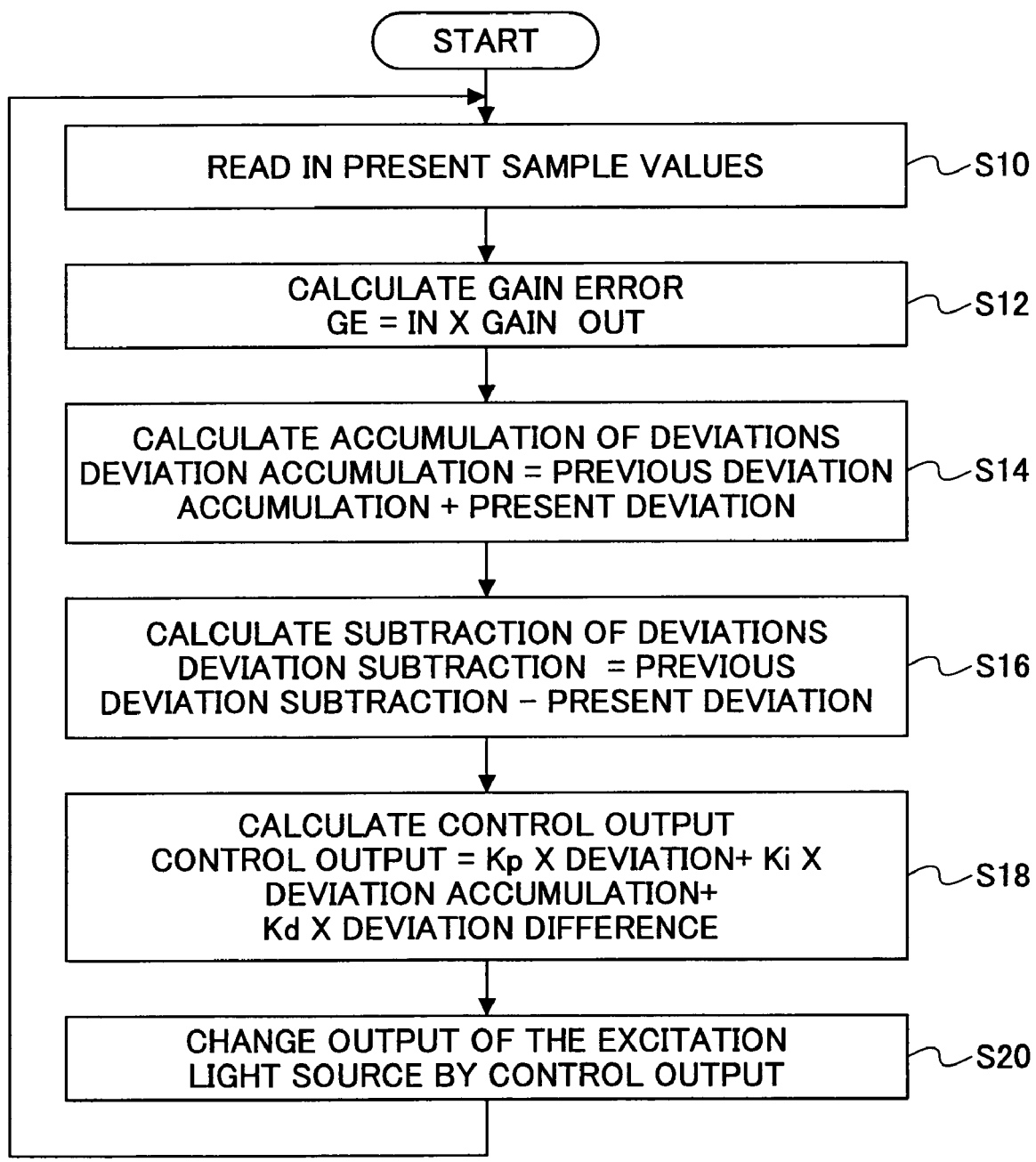
FIG. 8 is a flowchart illustrating an AGC control operation executed by the excitation light power control unit.

FIG. 8 is a flowchart illustrating an AGC control operation executed by the excitation light power control unit 34.

In FIG. 7, an ASE correction unit 50 accumulates the ASE compensation value from the ASE compensation unit 32 on the power of the input light from the optical sensor 20, and supplies the same to a gain error calculator 52.

The gain error calculator 52 obtains the power of the input light In, which is subjected to ASE compensation, and the power of the output light from the optical sensor 22, and calculates a deviation (gain error) GE with an object gain G by using the following equation (steps S10, S12).

$$GE = \text{In} \times G - \text{Out}$$

An integration control unit 54 calculates an accumulation of the deviations (step S14), and multiplies the accumulated deviations by an integration coefficient Ki. A differential controller 56 subtracts the present deviation from the preceding deviation, and finds the difference between the deviations (step S16), and multiplies the difference of the deviations by a differential coefficient Kd. A proportion control unit 58 multiplies the deviations by a proportional coefficient Kp. An accumulator 60 accumulates the output of the integration control unit 54 and the output of the proportion control unit 58, and calculates a control output of the power of the excitation light expressed by the following equation (step S18).

$$\text{control output} = Kp \times \text{deviation} + Ki \times \text{deviation accumulation} + Kd \times \text{deviation difference}$$

Here, the proportional coefficient Kp, the integration coefficient Ki, and the differential coefficient Kd are feedback coefficients, and if assuming that α=(α1, α2, α3), β=(β1, β2, β3), then α1, β1 correspond to Kp; α2, β2 correspond to Ki; and α3, β3 correspond to Kd.

The control output from the accumulator 60 is supplied to the excitation light source 24, and the power of the output light of the excitation light is variably controlled (step S20).

Figure 9:
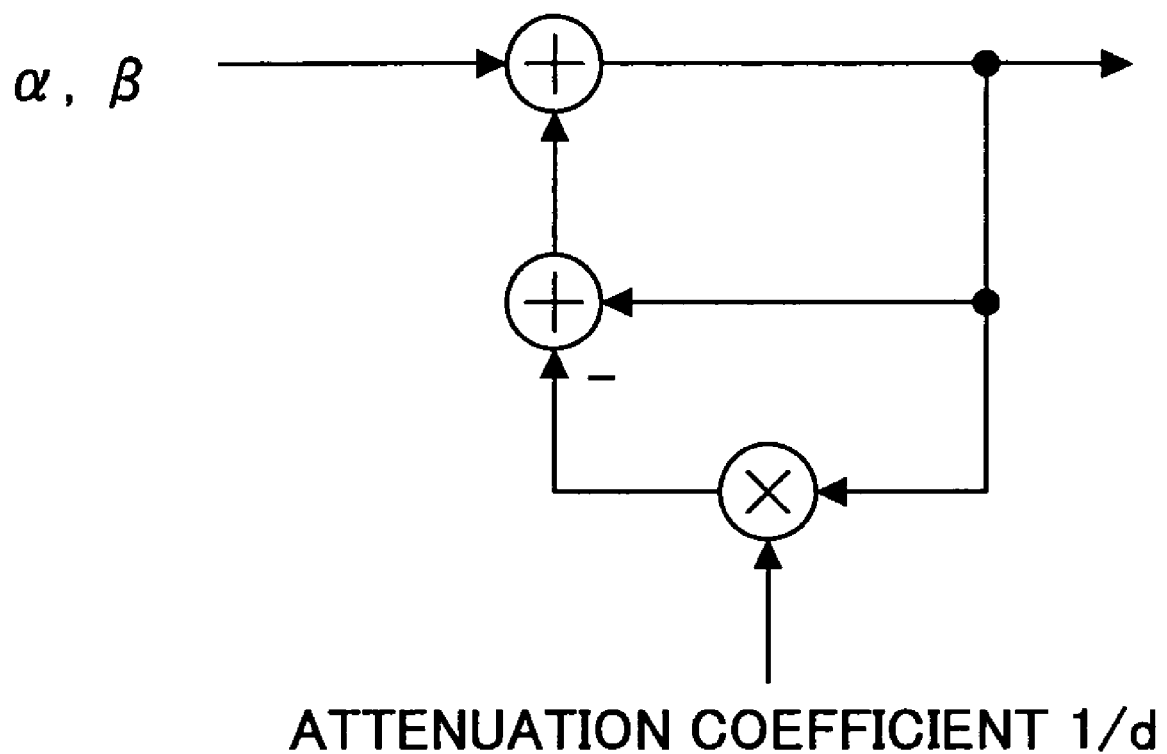
FIG. 9 is a circuit diagram of a buffering circuit in a mode switching unit.

Meanwhile, in the feedback coefficient output stage of the mode switching unit 48, a buffering circuit as illustrated in FIG. 9 is provided. When the feedback coefficients are switched from α to β, or from β to α, this buffering circuit makes the values of feedback coefficients output therefrom change gradually with time depending on an attenuation coefficient d. Due to this, when switching the feedback coefficients, it is possible to prevent variation of the power of the output light.

In this way, when increasing or decreasing the number of frequencies, the feedback coefficient α can be set large as usual, and in a steady state, the feedback coefficient β can be set small; in doing so, it is possible to prevent delay of tracking due to AGC during operations of increasing or decreasing the number of frequencies of light signals, and reduce amplification of noise in the steady state.

Further, comparison determination is made with a large range being set when increasing or decreasing the number of frequencies, and threshold determination is made with a small range being set in the steady state. In doing so, it is possible that operations of mode switching from operations of increasing or decreasing the number of frequencies to the steady state can quickly respond to convergence of the variation of the power of the output light occurring when operations of increasing or decreasing the number of frequencies are finished, and operations of terminating mode switching from the steady state to operations of increasing or decreasing the number of frequencies can more quickly respond to the variation of the power of the output light occurring when operations of increasing or decreasing the number of frequencies are started. In addition, plural ranges may be defined for each switching determination; thereby, it is possible to change the range according to the input levels.

Average values of the power of the output light obtained by making the average over time periods having different lengths are used as the references in the comparison determination. An average value over a short time period is used during operations of increasing or decreasing the number of frequencies, and an average value over a long time period is used in the steady state. In doing so, it is possible to prevent frequent mode switching due to influence of noise.

Figure 10:
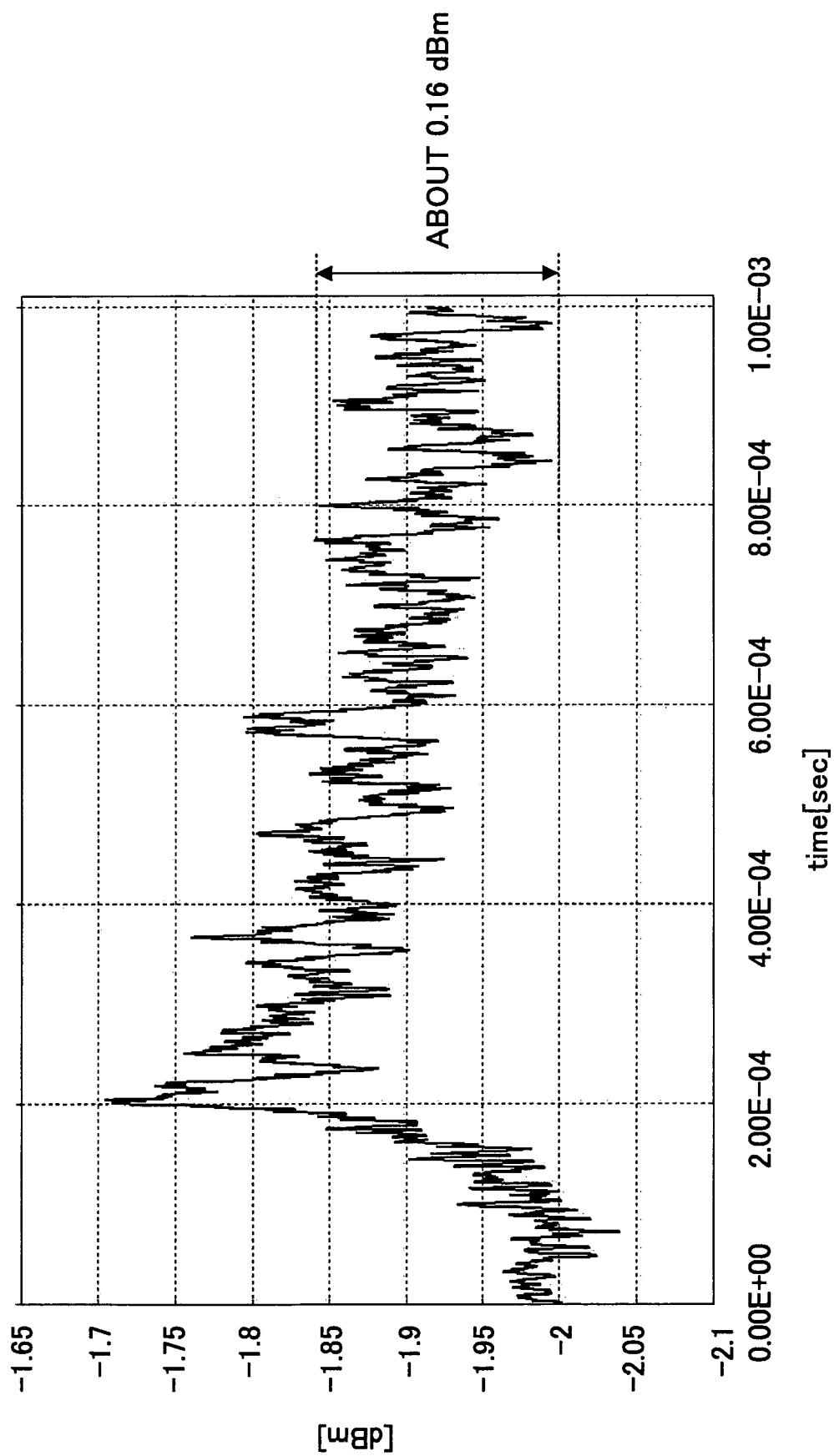
FIG. 10 is an output waveform when the number of frequencies is decreased from 40 to 1 in an optical amplifier of the related art.

FIG. 10 is an output waveform when the number of frequencies is decreased from 40 to 1 (monitor only one wave) in an optical amplifier of the related art.

Here, the variation of the power of the output light along with decreasing the number of frequencies becomes a peak near 200 μ sec; after that, by tracking the AGC control, the output level is converged to an object value. However, the variation of the power of the output light caused by the noise is large with one wave compared to the case of 40 waves, and even beyond 800 μ sec, where the frequency number decreasing control is convergent, the amplitude is still about 0.16 dBm. This is because the noise component in the input signal is amplified due to the AGC control.

Figure 11:
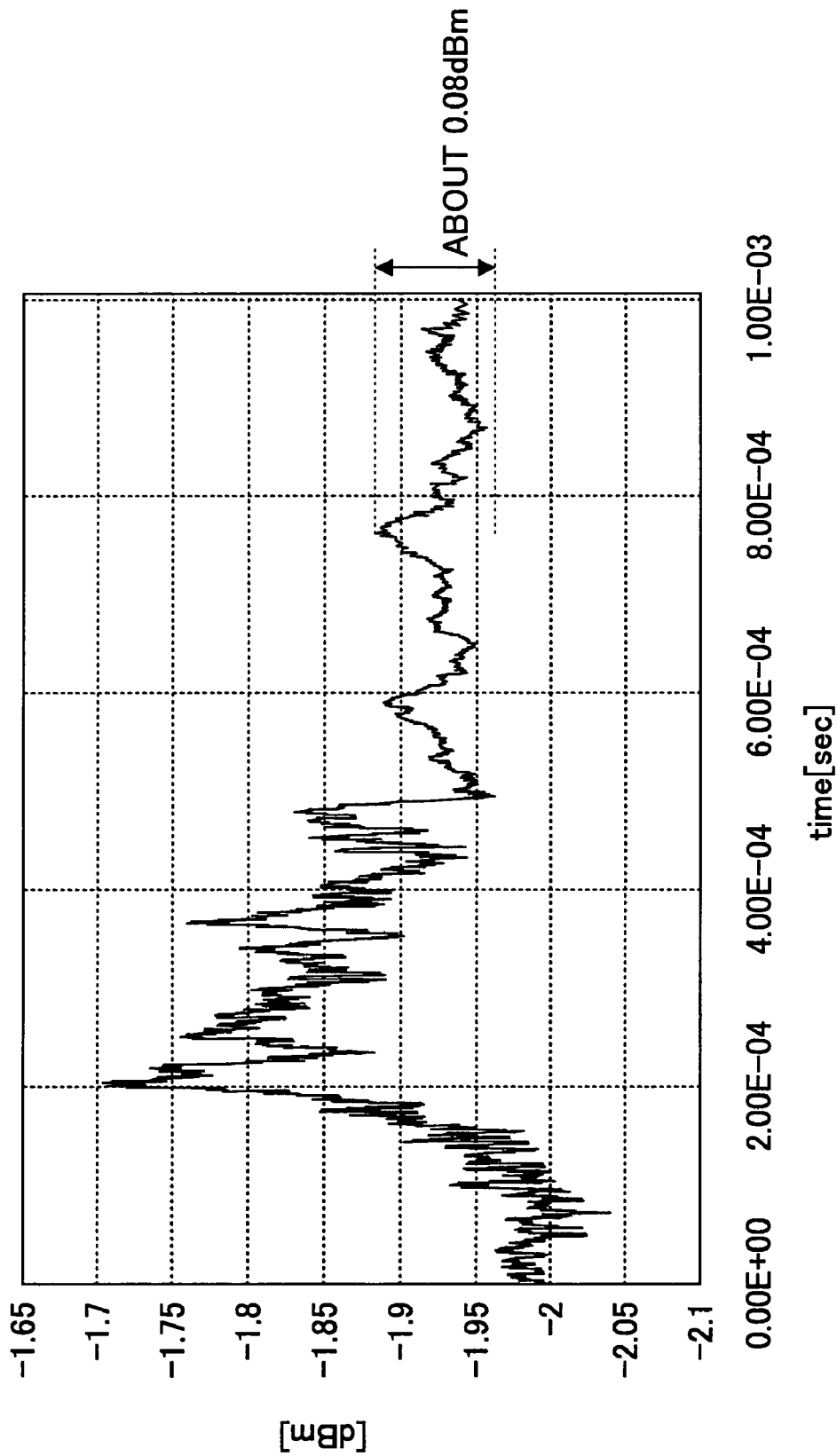
FIG. 11 is an output waveform when the number of frequencies is decreased from 40 to 1 in the optical amplifier of the present embodiment.

In comparison, FIG. 11 is an output waveform when the number of frequencies is decreased from 40 to 1 (monitor only one wave) in the optical amplifier of the present embodiment.

Here, the peak value of the variation of the power of the output light along with decreasing the number of frequencies does not change compared to that before the algorithm is applied. However, after convergence of the frequency number decreasing control, variation of the power of the output light caused by the noise is about 0.08 dBm; it is greatly improved.

In the present embodiment, it is described that the feedback control coefficient switching unit 30 switches the feedback control coefficients according to the power of the output light, but the present invention is not limited to this embodiment, and the feedback control coefficient switching unit 30 may also switch the feedback control coefficients according to the power of the input light, or both the power of the input light and the power of the output light.

Below, a description is made of operations of the ASE compensation unit 32.

Figure 12:
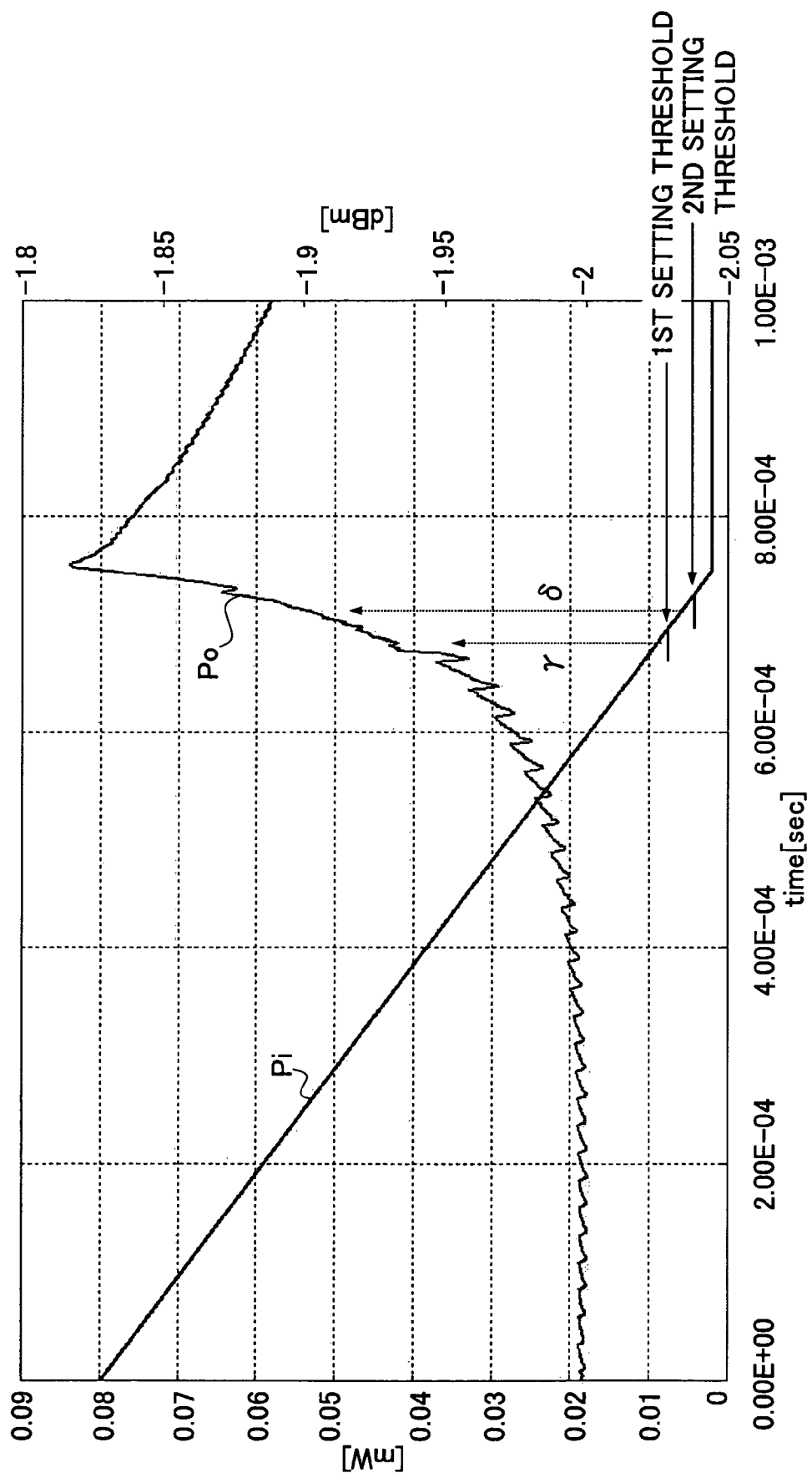
FIG. 12 shows input total power Pi and an output waveform Po when the number of frequencies is decreased from 40 to 1.

FIG. 12 shows an input total power Pi and an output waveform Po when the number of frequencies is decreased from 40 to 1 (monitor only one wave). Nevertheless, in order to explicitly present the influence of ASE, the noise is not added in the input signal. In FIG. 12, along with decrease of the input total power Pi, a peak caused by ASE noise is observed at 750 μ sec.

Figure 13:
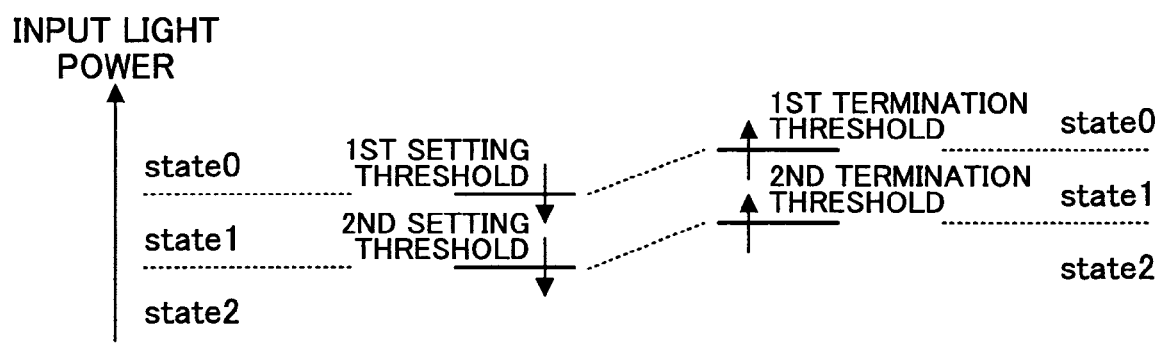
FIG. 13 shows the first and second setting thresholds, and the first and second termination thresholds defined for the input total power.

In order to compensate for the ASE noise, in the ASE compensation unit 32, as illustrated in FIG. 13, the first and the second setting thresholds are defined for the decreasing input total power Pi. When the input total power Pi becomes lower than the first setting threshold, along with a transition from a state 0 (input state) to a state 1, a first ASE compensation value γ is given to the excitation light power control unit 34. When the input total power Pi becomes lower than the second setting threshold, along with a transition from the state 1 to a state 2, a second ASE compensation value δ is given to the excitation light power control unit 34. The first, second ASE compensation values γ, δ are set to cancel out the variation of the power of the output light caused by the ASE noise.

As illustrated in FIG. 13, the first and the second termination thresholds are defined for the increasing input total power from the state 2. When the input total power Pi becomes higher than the second termination threshold (the second setting threshold<the second termination threshold<the first setting threshold), a transition occurs from the state 2 to the state 1. When the input total power Pi becomes higher than the first termination threshold, a transition occurs from the state 1 to the state 0.

Figure 14:
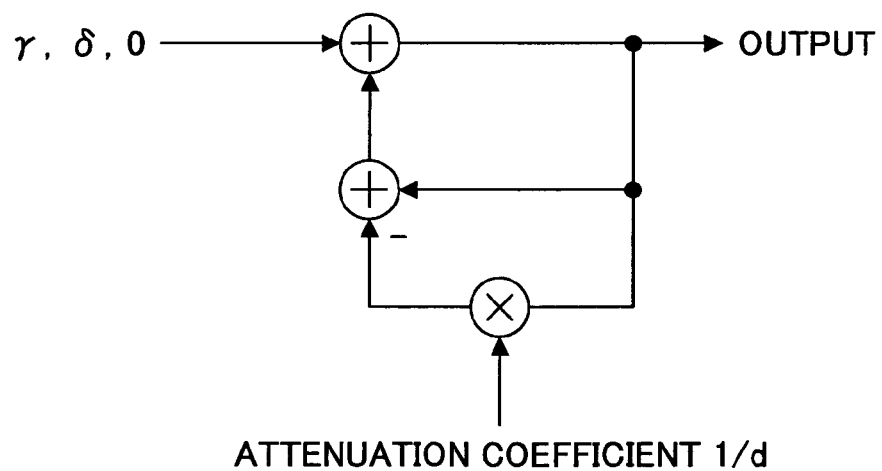
FIG. 14 is a circuit diagram of a buffering circuit in the ASE compensation unit 32.

In the output stage of the ASE compensation unit 32, a buffering circuit as illustrated in FIG. 14 is provided. The first, second ASE compensation values γ, δ are input to the buffering circuit only when the input total power Pi is lower than the first and second termination thresholds; otherwise, zero is input. Due to this, the first, second ASE compensation values γ, δ attenuate, along with time, gradually at an attenuation constant d until reaching zero, from the time when the first, second ASE compensation values are input.

In this way, while repeatedly executed operations of increasing and decreasing the number of frequencies can be dealt with, the ASE compensation can be accurately performed even when the noise is superposed on the previously described input signal. Because the ASE noise influences the AGC calculation results when the power of the input light is small, the ASE compensation value is not input when the input total power Pi is higher than the first and second termination thresholds.

Examples of the first, second setting thresholds, and the first, second termination thresholds are shown below. The first setting threshold is set to be 0.002993 mW corresponding to power of input light of 1.5 waves, and the second setting threshold is set to be 0.008979 mW corresponding to power of input light of 4.5 waves. The second termination threshold is set to be 0.01297 mW corresponding to power of input light of 6.5 waves, and the first termination threshold is set to be 0.006983 mW corresponding to power of input light of 3.5 waves. The first ASE compensation value is set to be 0.0000222 V, and the second ASE compensation value is set to be 0.0000970 V. Further, the attenuation coefficient is set to be $2.77 \times 10^{-4}$.

Figure 15:
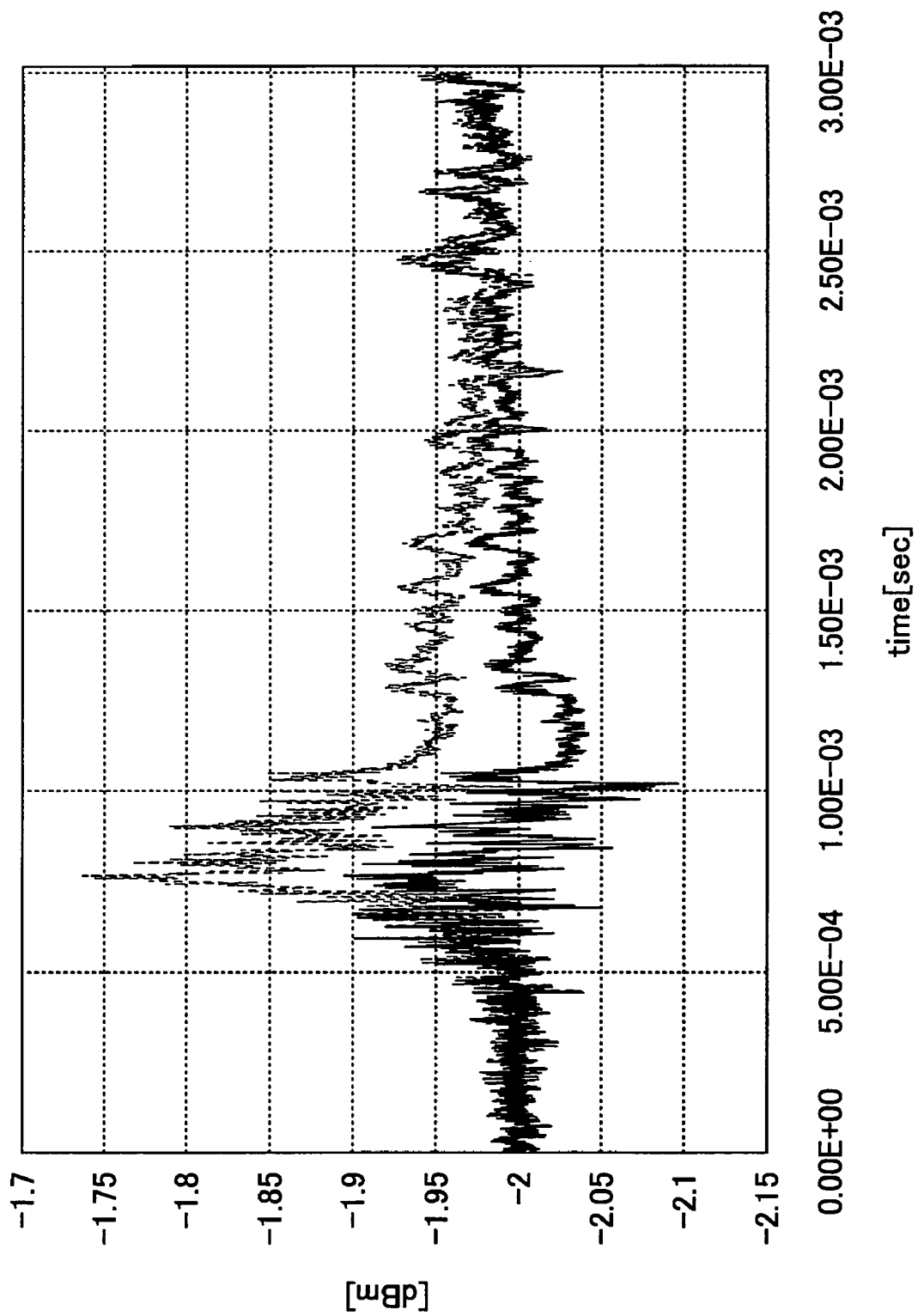
FIG. 15 shows output waveforms when the number of frequencies is decreased from 40 to 1 in an optical amplifier of the present invention and an optical amplifier of the related art.

FIG. 15 shows output waveforms when the number of frequencies is decreased from 40 to 1 in an optical amplifier of the present invention in the above case (solid line) and an optical amplifier of the related art (dashed line). In the optical amplifier of the present invention, the peak in the output waveform caused by the ASE noise is greatly reduced.

In this way, according to the present invention, even when influence of noise in the input signal is large in an optical amplifier, it is possible to reduce variation of power of output light caused by noise in a steady state without affecting operations of increasing and decreasing a number of frequencies of a light signal. Further, it is possible to reduce variation of power of the output light caused by ASE noise when decreasing the number of frequencies of the input light signal.

The feedback control coefficient switching unit 30 corresponds to the feedback control coefficient switching unit described in claims. The circuit in FIG. 9 corresponds to the feedback control coefficient buffering unit described in claims, the ASE compensation unit 32 corresponds to the ASE compensation unit described in claims, and the circuit in FIG. 14 corresponds to the ASE compensation value buffering unit described in claims.

While the invention has been described with reference to preferred embodiments, the invention is not limited to these embodiments, but numerous modifications could be made thereto without departing from the basic concept and scope described in the claims.

The invention claimed is:

1. An optical amplification device comprising:
   an automatic gain controller configured to perform automatic gain control in accordance with a control coefficient; and
   an adjusting unit configured to determine whether a current state is a first state or a second state by comparing magnitude of at least one of a measured power of input light to the optical amplification device and measured power of output light from the optical amplification device to a predetermined value, and changing the control coefficient in accordance with the determined current state, wherein
   the first state is a state in which a number of frequencies included in the input light is being increased or decreased, and the second state is a state in which the number of frequencies included in the input light is not being adjusted,
   the adjusting unit is configured to determine whether a transition occurred from the first state to the second state, or whether a transition occurred from the second state to the first state, to thereby determine the current state, and a predetermined range used for determining a transition from the first state to the second state is different from a predetermined range used for determining a transition from the second state to the first state.

2. The optical amplification device as claimed in claim 1, wherein each predetermined range has a reference value equaling an average value of an amplitude of at least one of the measured power of the input light and the measured power of the output light, and an average period used in calculation of the average value is different for the predetermined range used for determining a transition from the first state to the second state, as compared to the predetermined range used for determining a transition from the second state to the first state.

3. The optical amplification device as claimed in claim 1, wherein there is a plurality of the predetermined ranges used to determine a transition from the first state to the second state, and from the second state to the first state.

4. The optical amplification device as claimed in claim 1, wherein the adjusting unit includes a control coefficient buffering unit configured to gradually change the control coefficient.

5. An optical amplification as claimed in claim 1, further comprising:

an ASE compensation unit configured to compare the measured power of the input light with a predetermined threshold, and start generation of an ASE compensation value for the power of the input light in the gain control, when a number of frequencies included in the input light is being decreased.

6. The optical amplification device as claimed in claim 5, wherein the ASE compensation unit compares the measured power of the input light with a termination threshold higher than said predetermined threshold to terminate generation of the ASE compensation value, when the number of frequencies included in the input light is being increased.

7. The optical amplification device as claimed in claim 6, wherein the ASE compensation unit sets a plurality of the termination thresholds and a plurality of the predetermined thresholds.

8. The optical amplification device as claimed in claim 5, wherein the ASE compensation unit includes an ASE compensation value buffering unit configured to gradually attenuate the ASE compensation value.

9. An optical amplification device comprising:

an automatic gain controller performing automatic gain control in accordance with a control coefficient;

means for determining whether a current state is a first state or a second state by comparing magnitude of at least one of a measured power of input light to the optical amplification device and measured power of output light from the optical amplification device to a predetermined value; and means for changing the control coefficient in accordance with the determined current state, wherein the first state is a state in which a number of frequencies included in the input light is being increased or decreased, and the second state is a state in which the number of frequencies included in the input light is not being adjusted, the means for determining determines whether a transition occurred from the first state to the second state, or whether a transition occurred from the second state to the first state, to thereby determine the current state, and a predetermined range used for determining a transition from the first state to the second state is different from a predetermined range used for determining a transition from the second state to the first state.

* * * * *